United States Patent [19]
Ananthanarayanan

[11] Patent Number: 5,896,960
[45] Date of Patent: Apr. 27, 1999

[54] WELDED ROD FITTING DAMPER MANUFACTURE

[75] Inventor: Venkatasubramanian Ananthanarayanan, Dayton, Ohio

[73] Assignee: General Motors Corporation, Detroit, Mich.

[21] Appl. No.: 08/917,259

[22] Filed: Aug. 25, 1997

[51] Int. Cl.$^6$ .................................................. F16F 9/00
[52] U.S. Cl. .................. 188/321.11; 188/322.17; 219/58; 219/152; 219/107; 403/270
[58] Field of Search .................. 219/152, 56.1, 219/67, 58, 121.14, 107; 228/184, 176, 21; 141/329; 403/281, 305, 162, 300, 270, 271, 272, 221; 188/321.11, 322.17, 322.19, 322.21, 314, 315; 267/220; 29/888.044

[56] References Cited

U.S. PATENT DOCUMENTS

| | | | |
|---|---|---|---|
| 3,503,474 | 3/1970 | Raab | 188/321.11 |
| 3,655,017 | 4/1972 | Lorcher et al. | 188/321.11 |
| 3,816,701 | 6/1974 | Stormer | 219/152 |

*Primary Examiner*—Douglas C. Butler
*Attorney, Agent, or Firm*—Jeffrey A. Sedlar

[57] ABSTRACT

A method of manufacturing a suspension damper with a welded rod fitting includes attaching a piston rod to a piston assembly. The piston assembly with the attached piston rod is inserted into a tube so that the piston rod extends from the tube. Hydraulic fluid is added to the tube either before or after the piston assembly is inserted. A rod guide assembly is slidingly received over the piston rod and is secured to the tube. An end fitting is secured in a weld fixture. The tube, containing hydraulic fluid, the piston assembly, the secured rod guide and the extending piston rod is positioned so that the piston rod abuts the end fitting. An electrical current is passed through the end fitting and the piston rod. The piston rod is moved away from the end fitting forming a gap as the electrical current is passing through the end fitting and the piston rod so that an arc is established across the gap to weld the end fitting to the piston rod.

9 Claims, 4 Drawing Sheets

WELDED ROD FITTING DAMPER MANUFACTURE

TECHNICAL FIELD

The present invention relates to the manufacture of a damper with a welded rod fitting and more particularly, to a manufactured hydraulic suspension damper with a welded rod fitting that is attached to the damper after it is substantially assembled and filled with hydraulic fluid.

BACKGROUND OF THE INVENTION

A damper operates in vehicle suspensions as a damping device controlling the sprung (body), and unsprung (wheels), masses of a vehicle by reducing loads or vertical accelerations normally transmitted from the wheels to the body. Damping is accomplished by converting kinetic energy into thermal energy and dissipating the heat. Conventionally, hydraulic dampers include a piston with a connected piston rod slidably carried in a fluid-filled tube and separating the tube into extension and compression chambers. A rod guide at the top end of the tube closes the extension chamber and slidably engages the piston rod. The piston rod and the tube are provided with attachment fittings for connection to the sprung and unsprung masses. Due to the operating environment of the damper, the fittings must be securely connected to withstand the applied forces.

Often, the attachment fitting connected to the tube is secured by a welding process since this can be accomplished during the initial stages of assembly when the tube is dry, prior to the addition of hydraulic fluid. The attachment fitting connected to the piston rod is generally secured by a threaded joint. This is because the piston rod fitting is attached after the damper is assembled and filled with oil, since assembly of the damper's internal components requires access over the end of the rod. At this point, the damper may also carry a gas charge. Completing the threaded joint requires threading the rod's end, threading a matching component to be joined to the attachment fitting, mounting that component to the attachment fitting without deforming the threads, and assembling the two threaded parts. This process is undesirably costly.

Generally, it is known that a welded joint is an alternative to a threaded joint. Complications in welding a piston rod fitting to a substantially assembled damper exist. The joint is not amenable to resistance welding since axial loads on the rod of several hundred pounds would be required. Application of that magnitude of welding force is not possible without machining undesirable notches in the rod. Accordingly, a way of welding an attachment fitting to a piston rod that is assembled in a damper tube is required.

SUMMARY OF THE INVENTION

According to an aspect of the present invention, an end fitting is joined to a piston rod, that is carried by a substantially assembled damper, using a drawn arc welding process. This is advantageously accomplished without applying large axial loads to the rod, and without a need to machine notches into the rod.

A method of manufacturing a suspension damper according to this aspect includes attaching a piston rod to a piston assembly. The piston assembly with the attached piston rod is inserted into a tube so that the piston rod extends from the tube. Hydraulic fluid is added to the tube either before or after the piston assembly is inserted. A rod guide assembly is slidingly received over the piston rod and is secured to the tube. An end fitting is secured in a weld fixture. A subassembly including the tube containing hydraulic fluid, the piston assembly, the secured rod guide and the extending piston rod is positioned so that the piston rod abuts the end fitting. An electrical current is passed through the end fitting and the piston rod. The piston rod is moved away from the end fitting forming a gap as the electrical current is passing through the end fitting and the piston rod, so that an arc is established across the gap to weld the end fitting to the piston rod.

DETAILED DESCRIPTION OF THE PRESENTLY PREFERRED EMBODIMENT

Figures 1, 2:
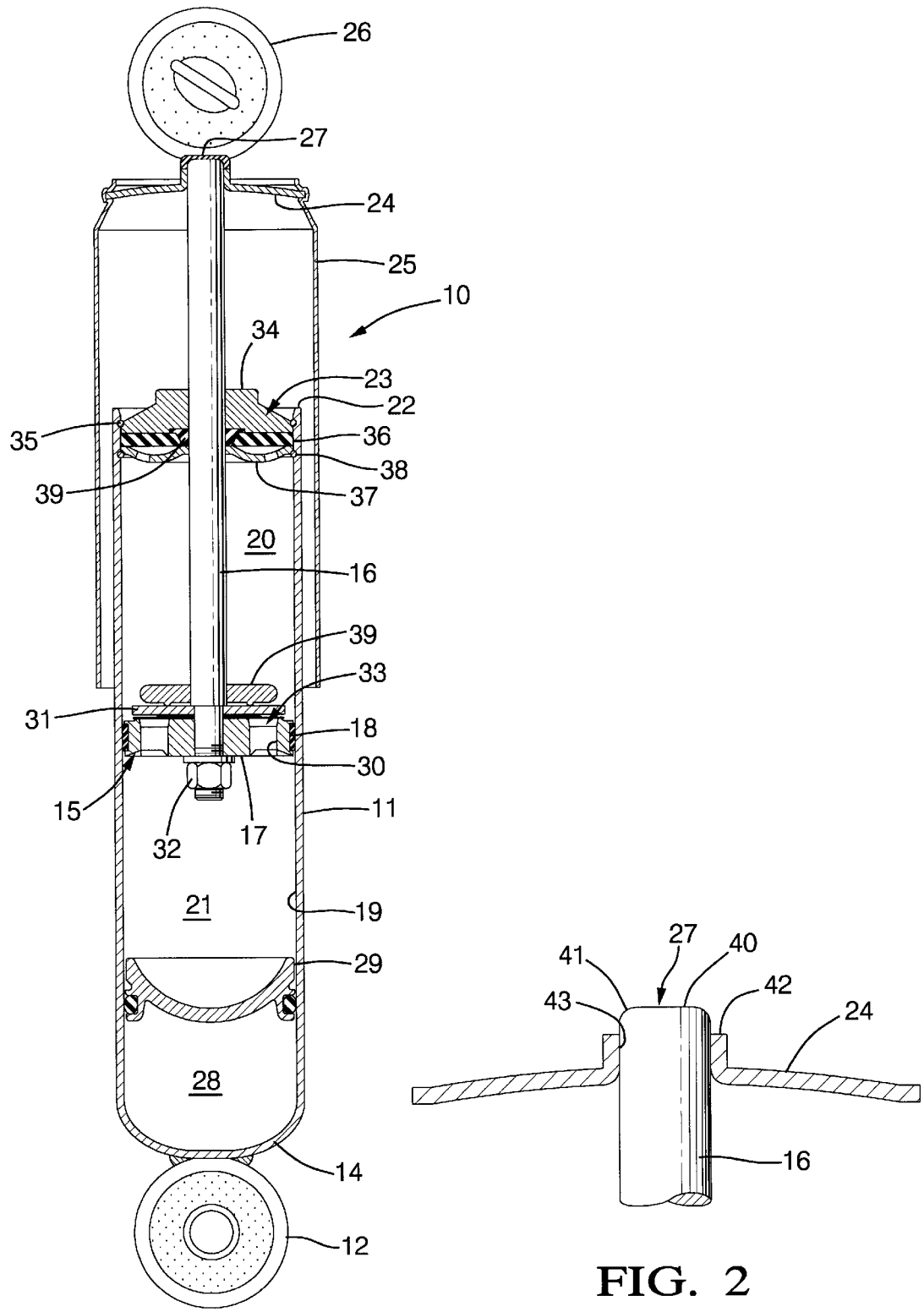
FIG. 1 is a fragmentary cross-sectional view of a suspension damper illustrating features of the present invention.
FIG. 2 is a schematic view of the suspension damper of FIG. 1 during an intermediate assembly stage.

Referring to the drawings, illustrated in FIG. 1 is a damper for a vehicle suspension embodied as shock absorber 10. At the outset it will be apparent to one skilled in the art that the present invention, though disclosed through a monotube type shock absorber embodiment, is not so limited in use and will lend itself to application in multiple tube shock absorbers and in other types of suspension dampers with or without gas charging. Application of the present invention in monotube dampers is particularly expedient however, since active travel length is at a premium and rod notches tend to undesirably detract from active travel length.

With specificity, shock absorber 10 includes an elongated cylindrical tube 11 having an attachment fitting 12 secured thereto for connection to a wheel assembly (not illustrated), as the unsprung mass in a vehicle's suspension system. The attachment fitting 12 is connected to the tube 11 by a conventional welding process such as resistance welding. The tube 11 is closed at its lower end by a base cup 14 which is secured thereto through a conventional means such as welding, or is formed as an integral part thereof. Tube 11 contains a quantity of oil (no reference number), that is used as a damping medium in the shock absorber 10. The damping piston assembly 15 is slidably mounted for reciprocal movement in the tube 11 and is affixed to the piston rod 16. Damping piston assembly 15 includes a steel piston body 17 which carries a band of low friction material 18 sealingly and slidably engaging the inner wall 19 of tube 11. Damping piston assembly 15 hydraulically separates the interior of tube 11 into two expansible and contractible working chambers designated as extension chamber 20 and compression chamber 21.

The upper end 22 of tube 11 is in general, provided with fastening devices such as snap rings and grooves (or is otherwise formed) to securely carry a rod guide assembly 23. The piston rod 16 extends through extension chamber 20 and rod guide assembly 23 exiting the tube 11. Piston rod 16 carries a cover plate 24 that supports a generally cylindrical dust tube assembly 25 which extends down over the tube 11. An end fitting 26 is securely engaged with the end 27 of piston rod 16 as detailed below. End fitting 26 is provided for attachment to the body of a vehicle (not illustrated), as the sprung mass of the suspension system. Therefore, in response to relative movement between the wheel assembly and the vehicle, the damping piston assembly 15 reciprocally moves within tube 11.

The oil that is carried in tube 11 provides a damping medium for the shock absorber 10. During a compression stroke, as the damping piston assembly 15 slides downward in the tube 11, an increasing volumetric amount of the piston rod 16 enters the tube 11 through the rod guide assembly 23. Therefore, a means of accommodating this increased volume within the shock absorber 10 must be provided. Accordingly, a compressible gas charge is carried within compensation chamber 28 which is separated from the compression chamber 21 by a reciprocal gas cup assembly 29. As the increasing amount of the piston rod 16 enters the tube 11 during a compression stroke of the shock absorber 10, the gas within compensation chamber 28 is compressed as the gas cup assembly 29 slides downward in response to displacement of the noncompressible hydraulic fluid carried within compression chamber 21 and extension chamber 20.

In greater detail, the damping piston assembly 15 includes the piston body 17 which is an annular element having a number of longitudinally extending openings designated in the aggregate as 30. The openings 30 are open to the compression chamber 21. The piston body 17 includes an opening that receives a turned down section of piston rod 16 and is secured thereon by a nut 32 that threadedly engages piston rod 16. Optionally, the piston body 17 is welded to the piston rod 16. A valve assembly 33 of the bi-directional monodisc type is carried about piston rod 16 against piston body 17 and normally closes the openings 30. The valve assembly 33 includes a disc stop 31 that is rigidly connected to the piston body 17, with a bumper 39 positioned against the disc stop 31. During compression directed travel of the damping piston assembly 15, the valve assembly 33 permits restricted flow from the compression chamber 21 to the extension chamber 20 and is tuned to provide a selected damping rate. During extension directed travel of the damping piston assembly 15, the valve assembly 33 permits restricted flow from the extension chamber 20 to the compression chamber 21 and is tuned to provide a selected damping rate, that may be different than the damping rate provided during compression.

Referring to the open end 22 of the tube 11, the rod guide assembly 23 includes a metal rod guide body 34 surrounding piston rod 16. The rod guide body 34 is fixed in the end 22 of tube 11 by a snap ring 35 and provides lateral support and a bearing surface for the piston rod 16. An annular static seal 36 is carried against the rod guide body 34 and is securely sealed therewith, and with the inner wall 19 of tube 11. Dynamic seal 39 is carried about the piston rod 16 providing a fluid tight closure at the rod guide assembly 23, and is positioned between the rod guide body 34 and the static seal 36. A flask 37 is fixed against static seal 36 and is maintained in position by a snap ring 38 that engages tube 11.

Referring to FIG. 2 along with FIG. 1, the process of manufacturing the damper 10 includes forming a relatively flat surface 40 at the end 27 of piston rod 16. The surface 40 is produced by shearing, machining or other means, and is surrounded by a rounded edge 41. Gas cup 29 is positioned in the tube 11 and the piston rod 16 is assembled into the tube 11 along with the piston assembly 15 including bumper 39 and nut 32. The rod guide assembly 23 including flask 37 and a quantity of hydraulic fluid are assembled with the tube 11. The cover plate 24 includes a flange 42 that forms an opening 43 that is received onto the piston rod 16 in a pressed on manner. Preferably, the cover plate 24 is assembled onto the piston rod 16 before the unit is assembled into the tube 11. In addition, the compensation chamber 28 is filled with a pressurized gas charge through an opening, (not illustrated), in the tube 11, preferably after the end fitting 26 is attached to the piston rod 16. With the damper 10 assembled, the piston rod 16 is extendable a maximum distance from the rod guide assembly 23 to a point where the piston assembly 15 compresses the bumper 39 against the flask 37. For the entire maximum distance, the piston rod 16 displays a straight uninterrupted cylindrical side surface from the end 27 to the rod guide assembly 23.

Figure 3:
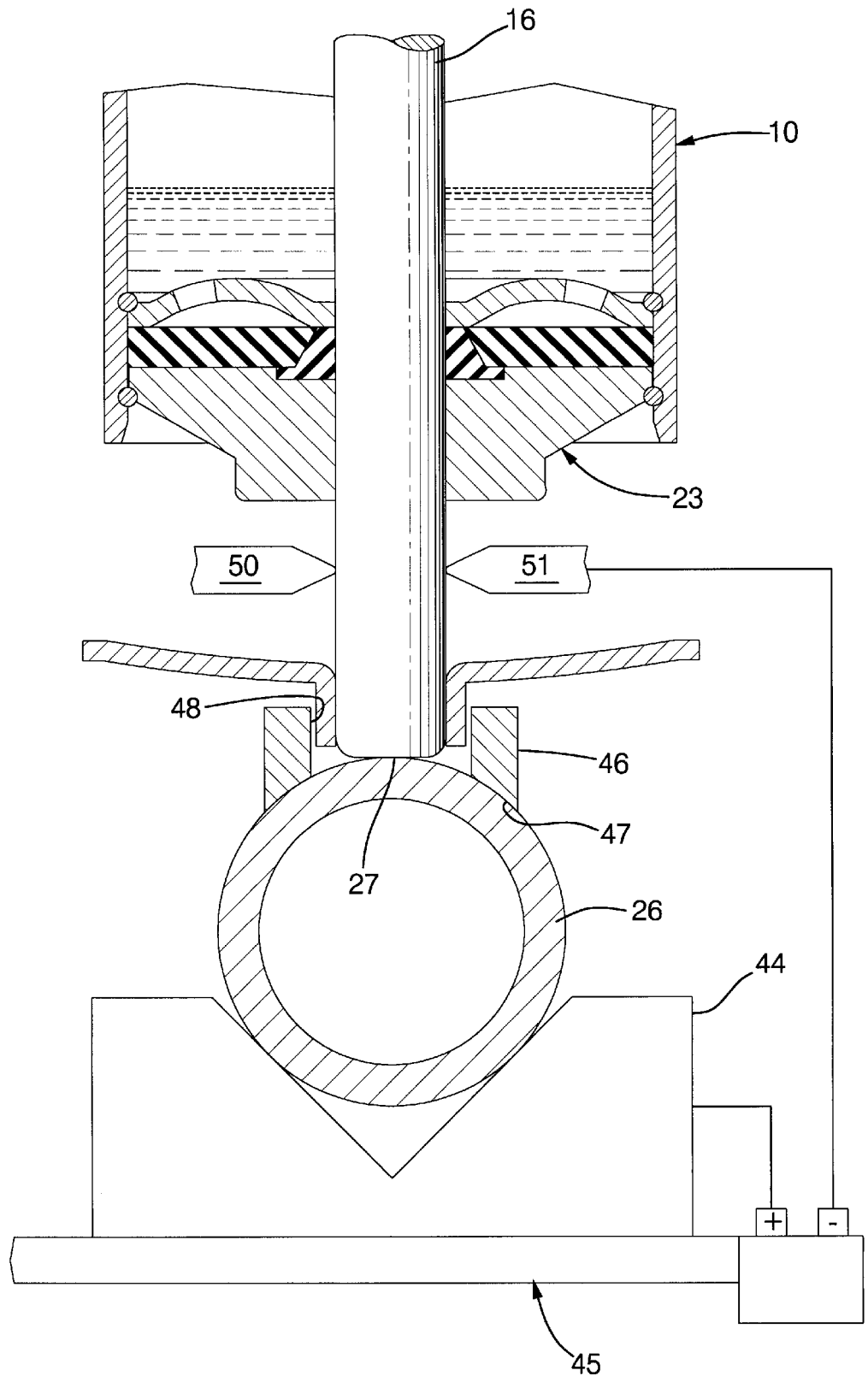
FIG. 3 is a schematic illustration of the suspension damper of FIG. 1 detailing assembly fixturing set-up.

Referring to FIG. 3, after the damper 10 is filled with hydraulic fluid and the piston rod 16 is secured in the tube 11 by the rod guide assembly 23, the end fitting 26 is attached to the damper 10. End fitting 26 is placed in a fixture 44 of a well known welding machine 45. The fixture 44 is made of common steel. The fixture 44 is connected to the positive electrode of the welding power supply in the present application, although the power supply direction can be reversed. A generally cylindrical ceramic ferrule 46 is formed with a beveled end 47, and is placed on the top of the end fitting 26 and is securely located in a centered position. The damper 10 is held in an inverted orientation so that the piston rod 16 extends downwardly. The end 27 of piston rod 16 is brought into contact with the end fitting 26 within the opening 48 of ferrule 46. Two ground electrode attachments 50 and 51 of the welding power supply are brought into contact with the piston rod 16, or optionally, with the cover plate 24, at suitable locations.

Figure 4:
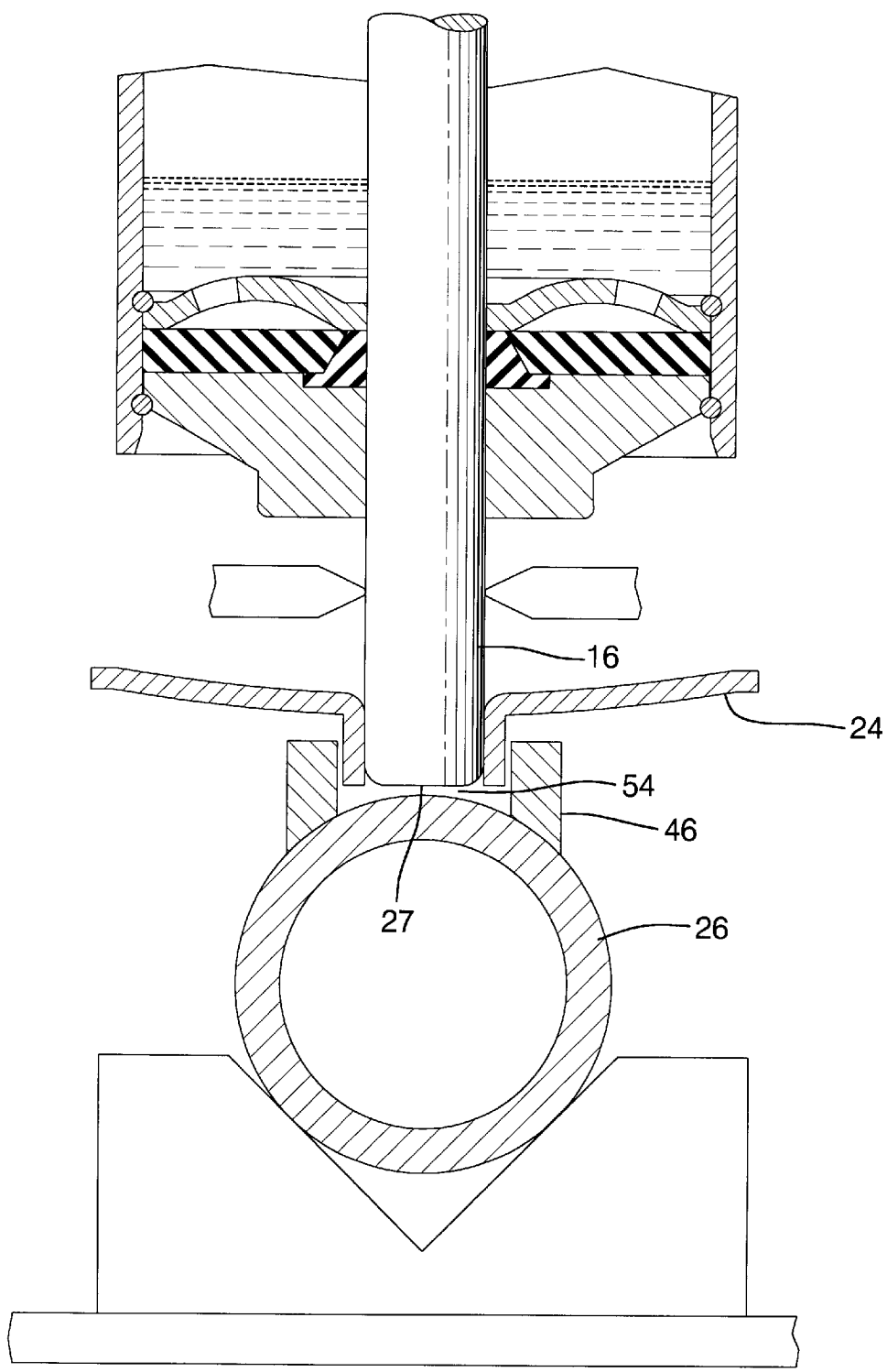
FIG. 4 is a schematic illustration of the suspension damper of FIG. 1 detailing the assembly process.

With the damper 10 and end fitting 26 in position, welding is carried out by applying a voltage between the electrodes 50, 51 and the fixture 44, in a range of approximately 10–30 volts. During sustained application of the voltage, the damper is raised at a predetermined UPVELOCITY of approximately 20 to 200 millimeters per second in the present application, so that the end 27 is located at a predetermined UPHEIGHT that is approximately one to six millimeters away from the end fitting 26. As the damper 10 is raised, the voltage is applied at a steady rate so that an arc develops across the gap 54, (shown on FIG. 4). The arc is established by a predetermined WELD CURRENT of approximately 500 to 2000 amperes in the present application for a predetermined WELD TIME of approximately 0.2 to 1.5 seconds in the present application. A hall effect type current sensor in the welding machine 45 measures the weld current. The weld current is controlled within the programmed values by the power supply's microprocessor, which suitably adjusts voltage input to a transformer/inverter in the weld power supply. Optionally, an initial pilot arc of low amperage in the order of 25 amperes for a time up to 0.2 seconds is used to clean the surfaces being welded and to establish a uniform arc across the surface 40 between end 27 and end fitting 26. As an additional option, an aluminum rich flux may be used to clean the weld interface and to assist in arc initiation.

Figure 5:
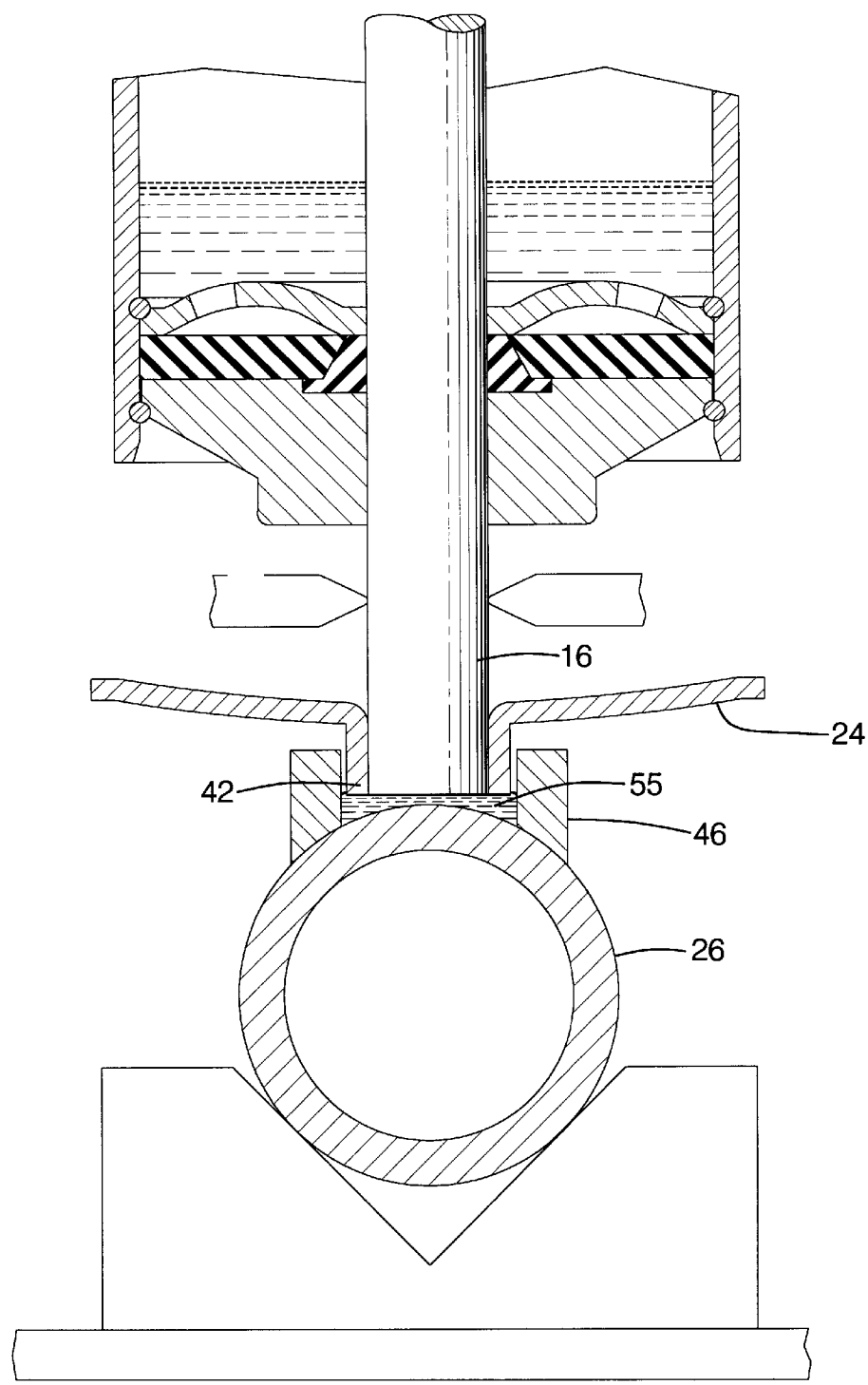
FIG. 5 is a schematic illustration of the suspension damper of FIG. 1 detailing the assembly process.

A molten weld puddle 55 develops from the material of the piston rod 16 and end fitting 26 as shown in FIG. 5, without the addition of filler metal. The ferrule 46 maintains the molten weld puddle 55 in position between the piston rod 16 and the end fitting 26 and the flange 42 of cover plate 24 is captured in the weld puddle 55. After the WELD TIME has expired, the power supply terminates the current and the damper is lowered so that the end 27 is immersed in the weld puddle 55 by lowering the end 27 at a predetermined DOWN VELOCITY of approximately 20 to 200 millimeters per second in the present application to a predetermined DOWN HEIGHT approximately three to eight millimeters below the UPHEIGHT in the present application connecting the piston rod 16 to the end fitting 26. The joint is allowed to cool in the welding machine 45 for a small fraction of a second in the present application, and the damper 10 is removed. Preferably, after removal of the damper from the welding machine 45, the ferrule 46 is broken and removed so that the damper 10 of FIG. 1 results. Constructing the ferrule 46 from ceramic material advantageously produces a device that withstands the high heat developed during welding without interfering with arc development, and that is easily removed.

Through the foregoing process, an end fitting is joined to a piston rod that is carried in a substantially assembled damper, using a drawn arc welding process. This is advantageously accomplished without applying large axial loads to the rod, and without a need to machine notches into the rod.

What is claimed is:

1. A method of manufacturing a suspension damper comprising the steps of:
   (a) attaching a piston rod to a piston assembly;
   (b) inserting the piston assembly with the attached piston rod into a tube so that the piston rod extends from the tube;
   (c) adding hydraulic fluid to the tube;
   (d) sliding a rod guide assembly over the piston rod;
   (e) securing the rod guide assembly to the tube;
   (f) positioning an end fitting in a weld fixture;
   (g) positioning the tube, containing hydraulic fluid, the piston assembly, the secured rod guide and the extending piston rod so that the piston rod abuts the end fitting;
   (h) passing an electrical current through the end fitting and the piston rod; and
   (i) moving the piston rod away from the end fitting forming a gap as the electrical current is passing through the end fitting and the piston rod so that an arc is established across the gap to develop a molten puddle welding the end fitting to the piston rod.

2. A method of manufacturing a suspension damper according to claim 1 further comprising the step of lowering the piston rod into the molten puddle.

3. A method of manufacturing a suspension damper according to claim 2 further comprising the step of placing a ferrule on the end fitting after positioning the end fitting in the weld fixture in step (f).

4. A method of manufacturing a suspension damper according to claim 3 further comprising the step of breaking the ferrule off the damper.

5. A suspension damper manufactured according to the method of claim 4 wherein the piston rod extends from the rod guide a maximum distance and further comprising a straight uninterrupted cylindrical side surface on the piston rod for the entirety of the maximum distance.

6. A method of manufacturing a suspension damper comprising the steps of:
   (a) attaching a piston rod to a piston assembly;
   (b) inserting the piston assembly with the attached piston rod into a tube so that the piston rod extends from the tube;
   (c) adding hydraulic fluid to the tube;
   (d) sliding a rod guide assembly over the piston rod;
   (e) securing the rod guide assembly to the tube;
   (f) positioning an end fitting in a weld fixture;
   (g) positioning the tube, containing hydraulic fluid, the piston assembly, the secured rod guide and the extending piston rod so that the piston rod abuts the end fitting;
   (h) passing an electrical current through the end fitting and the piston rod;
   (i) moving the piston rod away from the end fitting to a specified UPHEIGHT at a specified UPVELOCITY forming a gap as the electrical current is passing through the end fitting and the piston rod so that an arc is established across the gap by a specified WELD CURRENT to develop a molten puddle from the end fitting and the piston rod without adding filler metal;
   (j) maintaining the WELD CURRENT for a specified WELD TIME;
   (k) lowering the piston rod at a specified DOWN VELOCITY to a specified DOWN HEIGHT; and
   (l) allowing the molten puddle to cool and solidify welding the end fitting to the piston rod.

7. A method of manufacturing a suspension damper according to claim 6 further comprising the step of placing a ferrule on the end fitting after positioning in the weld fixture in step (f).

8. A method of manufacturing a suspension damper according to claim 7 further comprising the step of breaking the ferrule off the damper.

9. A suspension damper comprising:
   a tube with a closed end and an open end and separated into extension and compression chambers by a slidable piston assembly with a rod guide assembly closing one end of the tube and a piston rod attached to the piston assembly and exiting the tube through the rod guide;
   wherein the suspension damper is manufactured according to the steps of:
   (a) connecting the piston to the piston rod;
   (b) assembling the piston assembly in the tube;
   (c) adding hydraulic fluid to the tube;
   (d) closing the open end of the tube by assembling the rod guide assembly around the piston rod and in the tube;
   (e) securing the rod guide assembly to the tube
   (f) positioning an end fitting in a weld fixture;
   (g) positioning the tube, containing hydraulic fluid, the piston assembly, the secured rod guide and the extending piston rod so that the piston rod abuts the end fitting;
   (h) passing an electrical current through the end fitting and the piston rod;
   (i) moving the piston rod away from the end fitting to a specified UPHEIGHT at a specified UPVELOCITY forming a gap as the electrical current is passing through the end fitting and the piston rod so that an arc is established across the gap by a specified WELD CURRENT to develop a molten puddle from the end fitting and the piston rod;
   (j) maintaining the WELD CURRENT for a specified WELD TIME;
   (k) lowering the piston rod at a specified DOWN VELOCITY to a specified DOWN HEIGHT; and
   (l) allowing the molten puddle to cool and solidify welding the end fitting to the piston rod.

* * * * *